(12) United States Patent  
Charaudeau et al.

(10) Patent No.: US 7,096,985 B2
(45) Date of Patent: Aug. 29, 2006

(54) VEHICLE WITH A SUPER-CAPACITOR FOR RECOVERY OF ENERGY ON BRAKING

(75) Inventors: Jean-Jacques Charaudeau, Cottens (CH); Gerald Bourqui, Villars-Sur-Glane (CH); Pierre Varenne, Neyruz (CH)

(73) Assignee: Conception et Developpement Michelin SA, Givisiez (CH)

( * ) Notice: Subject to any disclaimer, the term of this patent is extended or adjusted under 35 U.S.C. 154(b) by 178 days.

(21) Appl. No.: 10/096,744

(22) Filed: Mar. 13, 2002

(65) Prior Publication Data

US 2002/0139593 A1    Oct. 3, 2002

(30) Foreign Application Priority Data

Mar. 14, 2001  (FR)  ................................. 01 03493

(51) Int. Cl.
*B60K 1/00* (2006.01)
(52) U.S. Cl. .................................. 180/65.2; 180/65.3
(58) Field of Classification Search ............... 180/65.1, 180/65.2, 65.3, 65.4, 65.5, 65.6, 65.7, 65.8, 180/300; 477/3, 4, 118 X, 7; 318/434, 139, 318/587; 60/716, 718
See application file for complete search history.

(56) References Cited

U.S. PATENT DOCUMENTS

| 4,335,429 | A | * | 6/1982 | Kawakatsu ................... 701/22 |
| 4,407,132 | A | * | 10/1983 | Kawakatsu et al. ........ 180/65.4 |
| 5,075,616 | A | * | 12/1991 | Mitsui ......................... 322/10 |
| 5,318,142 | A | * | 6/1994 | Bates et al. ................. 180/65.2 |
| 5,469,816 | A |  | 11/1995 | Murakawa et al. |
| 5,650,713 | A | * | 7/1997 | Takeuchi et al. ........... 180/65.3 |
| 5,722,502 | A |  | 3/1998 | Kubo |
| 5,806,617 | A | * | 9/1998 | Yamaguchi ................. 180/65.2 |
| 6,054,844 | A | * | 4/2000 | Frank ......................... 180/65.2 |
| 6,102,144 | A | * | 8/2000 | Lutz ........................... 180/65.2 |
| 6,140,780 | A | * | 10/2000 | Oshima et al. ............ 180/65.2 |
| 6,223,106 | B1 |  | 4/2001 | Yano et al. |
| 6,291,953 | B1 | * | 9/2001 | Lovatt et al. .............. 180/65.1 |

FOREIGN PATENT DOCUMENTS

| DE | 4430670 A1 | 8/1994 |
| DE | 4430670 A1 | 3/1995 |
| DE | 19923277 A1 | 5/1999 |
| DE | 19937381 A1 | 7/1999 |
| DE | 19923277 A1 | 12/1999 |
| DE | 69610360 T2 | 12/1999 |
| EP | 0829389 B1 | 9/1997 |
| FR | 2791481 | 3/1999 |

OTHER PUBLICATIONS

Notice of Opposition in EP 02004995.3.
Zelinka, A. Lange, and S. Kerschi, "Trails Results Relating to the Diesel Electric Bus MAN NL 223 DE with ELVODRIVE," presented at Tramways Without an Overhead Wire Symposium, Kaiserslautem, 1999 (presentation schedule attached).

* cited by examiner

*Primary Examiner*—Hau Phan
(74) *Attorney, Agent, or Firm*—Fitzpatrick, Cella, Harper & Scinto

(57) ABSTRACT

A vehicle has an engine driving an alternator. The electrical energy supplied by the alternator feeds an electric traction motor, via a rectifier, an electric line, and an inverter. The electric traction motor is mechanically coupled to a wheel. A super-capacitor is connected to the electric line by a voltage-matching circuit. A unit for controlling the torque applied to the vehicle wheel manages the circulation of the electrical energy in the drivetrain so as always to discharge the super-capacitor as a priority, in order to be able to be ready to recover the energy at the next braking.

6 Claims, 2 Drawing Sheets

VEHICLE WITH A SUPER-CAPACITOR FOR RECOVERY OF ENERGY ON BRAKING

BACKGROUND OF THE INVENTION

1. Technical Field of the Invention

The present invention relates to road motor vehicles using electricity for their propulsion.

2. The Related Art

For example, series hybrid vehicles and parallel hybrid vehicles are known. In vehicles with a so-called series hybrid drivetrain, an engine drives an alternator which converts the mechanical energy available at the shaft of the engine into electrical energy. This electrical energy supplies one or more electric traction motors mechanically connected to the driving wheels of the vehicle. The engine is not mechanically connected to the wheels. In vehicles with a so-called parallel hybrid drivetrain, an engine and an electric motor are both mechanically connected to the driving wheels; the torques which they deliver can be added together to drive the driving wheels.

In both cases, it is well known to install electric accumulators, especially where it is desired to be able to drive the vehicle in purely an electric mode, with the engine switched off. It is also well known to recover at least part of the energy on braking a vehicle, by operating the electric traction motor as a generator, and thus converting the kinetic energy into electrical energy which is stored, rather than dissipating as heat.

However, the use of electric accumulators presents various problems. Such a device has a high mass compared with the amount of electrical energy stored. For example, a lead-acid battery can store about 20 Wh/kg. This considerably increases the mass of a vehicle. It is also a source of a waste of energy during acceleration, and even during braking, since the efficiency of the conversions of kinetic energy into electrical energy and of electrical energy into kinetic energy cannot be 100%. Furthermore, the problems with the dynamic behavior of a vehicle are all the more crucial if the vehicle is heavy. In addition, the known batteries do not accept sufficiently intense recharging currents to be able to rapidly recover a lot of braking energy. And it has been found that the greater the desire to recover the energy on braking, the greater is the mass of batteries installed in the vehicle, this in itself being an energy consumer during the acceleration phases. Of course, the lower the efficiencies in the energy conversions, the less is recovered on braking of the energy which has had to be expended to accelerate this excess mass due to the batteries.

The object of the present invention is to design a drivetrain having a device in which the electrical energy can be stored during braking. The problem which arises, therefore, to be able to recover and store sufficient energy to improve the overall efficiency significantly, that is to say, to reduce the fuel consumption for a given duty.

SUMMARY OF THE INVENTION

The invention proposes an electric drivetrain for a vehicle, the drivetrain comprising:

at least one acceleration and deceleration control device at the disposal of the vehicle driver;

a processing unit for the at least one control device allowing the desired driving torque to be determined and evaluated and the desired braking torque to be determined and evaluated;

an electrical energy source, available for the traction of the vehicle;

at least one electric machine connected to at least one driving wheel, and coupled to an electric line connecting the electrical energy source and the electric machine, the electric machine being capable of operating as a motor by absorbing electrical energy available on the electric line and by transmitting a driving torque to the driving wheel, the electric machine also being capable of operating as a generator by transmitting a braking torque to the driving wheel and by restoring electrical energy on the electric line;

an electrical energy storage device connected to the electric line, the electrical energy storage device consisting of one or more super-capacitors;

a device for managing the operating mode selecting an energy recovery mode or an energy restoration mode;

a unit for controlling the torque applied to the vehicle wheel, allowing:

in the case of a demand for driving torque, the electric machine to be operated as a motor by consuming the electrical energy stored in the electrical energy storage device as long as the charge of the electrical energy storage device is not minimal, as a priority over the use of the electrical energy source for supplying the energy necessary for the traction of the vehicle, and in the case of a demand for braking torque, the electric machine to be operated as a generator by using the electrical energy produced to recharge the electrical energy storage device as long as the charge of the electrical energy storage device is not maximal, as a priority over the use of any other braking device.

The present invention proposes management of energy which is valid both where the electrical energy source is a petrol or diesel engine driving an alternator, such as in a hybrid vehicle, and where the electrical energy source is a fuel cell or an electrochemical battery. In the case of hybrid vehicles, the present invention proposes management of energy which is valid both for series and parallel hybrid vehicle architecture. Only the case of series hybrid vehicles is described hereinbelow, it being pointed out that the case of vehicles with a fuel cell or with an electrochemical battery is similar to the case of the series hybrid vehicle.

Particular use is made of a particular type of component capable of accumulating electrical energy, namely the components known as "super-capacitors", or "ultra-capacitors", or "double-layer capacitors", proposed for example by the company Montena Components S.A., CH-1728 ROSSENS under the trade mark Boostcap®. These components have the advantageous feature of being able to store much greater amounts of electrical energy than conventional capacitors, making them similar to electrochemical batteries, and of being able to admit large discharging and, above all, charging currents, unlike electrochemical batteries, thus making them similar to conventional capacitors. If the various electric components mentioned above are placed on a diagram, the X-axis of which gives the density of absorbed electric power (W/kg) and the Y-axis gives the density of stored electrical energy (Wh/kg), the super-capacitors occupy an intermediate zone between the zone occupied by electrochemical accumulators and conventional capacitors (Ragone diagram).

It should be noted, in passing, that the acceleration and deceleration control device at the disposal of the vehicle driver may take the form of separate pedals, an accelerator pedal and a brake pedal, as is customary on conventional vehicles, or take the form of a single control.

The invention starts from the observation of the various types of journeys which a vehicle is likely to make.

On mountainous journeys, when travelling downhill, the vehicle often operates in a braking phase. But, in this case, the periods during which the vehicle has to be restrained or decelerated are extremely long and if it is desired to recover the energy during all of these phases, it is necessary to use considerable storage capacities. The weights of the storage systems installed in the vehicle could become prohibitive, whatever the technology used for these systems. It is not, therefore, this type of journey which may in itself justify the fitting of means for storing the electrical energy recovered during braking.

When travelling on the level, there are relatively few braking phases of the vehicle and therefore the energy which could be recovered during braking is relatively small compared with the total energy involved with ensuring the normal displacement of the vehicle.

On urban journeys, there are numerous relatively short acceleration phases followed by likewise relatively short deceleration phases. Even for a modest electrical energy storage capacity, a lot of energy can be recovered compared with the total amount of energy which has to be produced to ensure the displacement of a vehicle. It is evident that it is above all on urban journeys that it is worthwhile recovering the energy on the braking of the vehicle. For it is on this type of journey that the amount of energy which has to be produced to ensure the braking of the vehicle represents a significant proportion compared with the amount of energy which has to be produced to ensure the acceleration of the vehicle. And it is above all on urban journeys that the acceleration and deceleration phases rapidly follow one another. It is evident that it is therefore unnecessary to have accumulators with a large storage capacity to be able to recover a significant proportion of energy in this case.

The observations of the applicant have led to the estimation that, for an urban journey, the energy produced by the deceleration of a vehicle represents from 30% to 40% of the energy produced by the acceleration of the said vehicle. Let us take a realistic example. For a vehicle of 1000 kg travelling at 50 km/h, the energy potentially recoverable during braking is about 85 kJ. If it is desired to stop this vehicle in 10 seconds, the braking power involved over 10 seconds is about 8.5 kW on average. Using the current technology of super-capacitors, it is readily possible to employ components so as to have available a peak power equal to at least twice the average braking power mentioned above, both in charging and discharging. By way of illustration, for 85 kJ, the mass of the energy storage device based on super-capacitors is of the order of 15 kg, and the volume of the order of 20 liters. Regardless of the technology used for the electrical energy storage device, the following dimensioning is proposed: it proves advantageous for the storage device to be able to store at least 70 kJ, and preferably at most 150 kJ, per ton of vehicle.

The principle of energy management described here may be applied both to a series hybrid vehicle and to a parallel hybrid vehicle, or any other form of electric traction vehicle. By choosing an electrical energy storage device with a relatively small capacity, this principle allows construction of a vehicle which, despite everything, is still relatively light. In its applications to hybrid vehicles, the invention does not seek to construct a vehicle with zero emission. It proposes to construct a relatively versatile vehicle, intended to travel both in the country and in town and, on urban journeys, to utilize the energy in accordance with the task performed by the vehicle in the best possible way.

This management principle is therefore proposed which aims as a priority always to discharge the storage device accumulating the electrical energy, so as to be able to be ready to recover the energy on the next braking. By virtue of this management principle, a statistically large proportion of braking energy can be recovered with a relatively small capacity of the electrical energy storage device. The priority aim always to try to discharge the energy storage device does not exclude the possibility of the energy used for acceleration also coming from a source other than the electrical energy storage device, if the demand for acceleration coming from the driver is too great.

BRIEF DESCRIPTION OF THE DRAWINGS

The invention is illustrated by means of the attached drawings, in which.

DESCRIPTION OF ILLUSTRATIVE EMBODIMENTS

Figure 1:
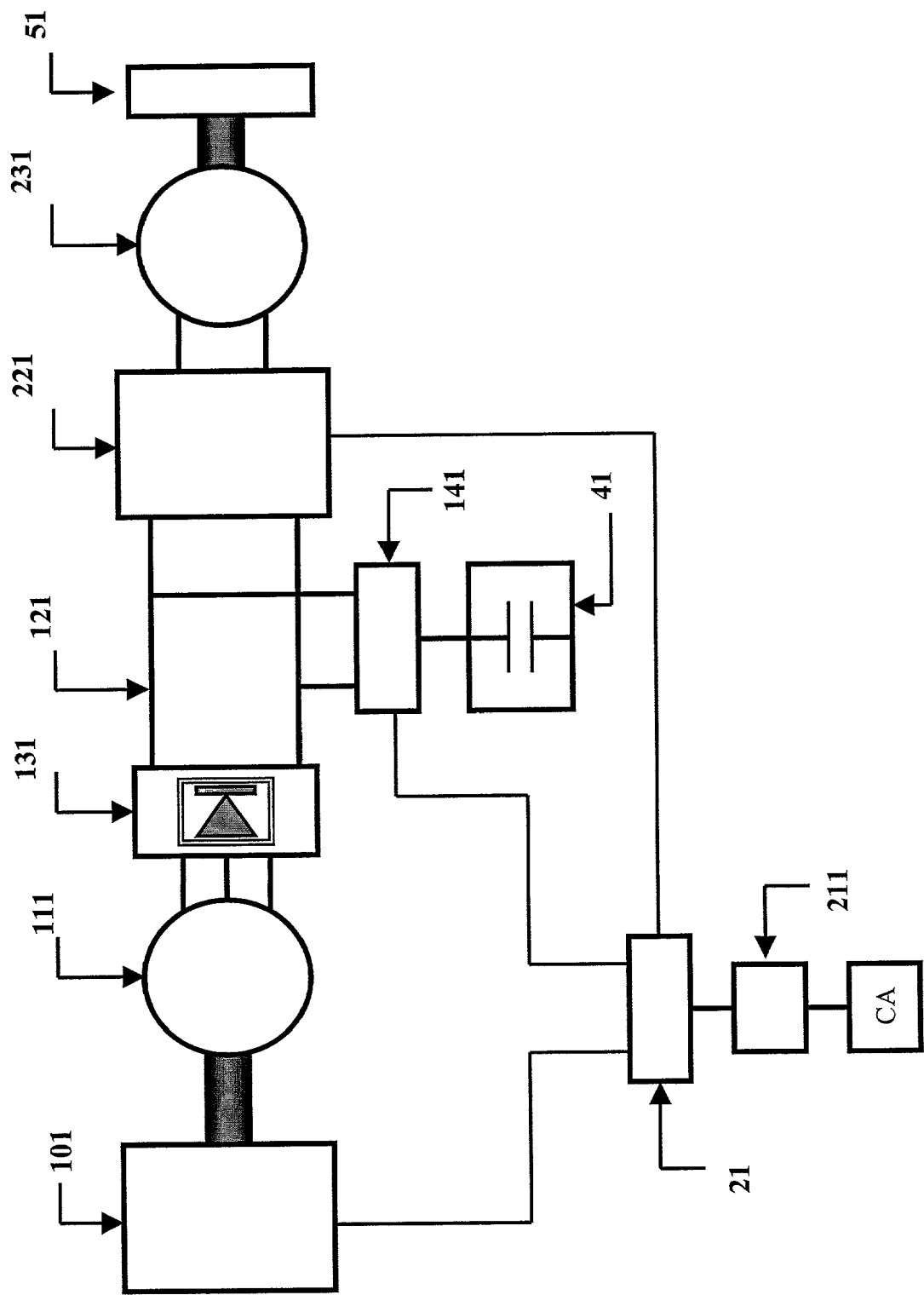
FIG. 1 is block diagram of a drivetrain for a series hybrid vehicle according to the invention.

In FIG. 1, there can be seen an engine 101 driving an alternator 111. The electrical energy supplied by the latter feeds an electric traction motor 231, via a rectifier 131, an electric line 121, and an inverter 221. It should be mentioned, in passing, that in the case of a vehicle with a fuel cell, the electrical energy generating system replaces the elements 101, 111 and 131 of FIG. 1.

The electric traction motor 231 is mechanically coupled to a wheel 51. A super-capacitor 41 is connected to the electric line 121, by means of a device 141 for managing the operating mode. There are two operating modes: the energy "recovery" mode and the energy "restoration" mode. The assembly consisting of super-capacitor 41 and management device 141 is connected in parallel with the assembly consisting of electric traction motor 231 and inverter 221.

A unit 21 for controlling the torque applied to the vehicle wheel manages the circulation of the electrical energy in the drivetrain. This unit receives, among other things, the appropriate signals coming from a processing unit 211 for an acceleration control device CA at the disposal of the vehicle driver. Assuming that the super-capacitor 41 is discharged to start with, at the first deceleration, the unit 21 for controlling the torque applied to the vehicle wheel orders the inverter 221 to drive the electric motor 231 as a generator, at a braking torque level corresponding to the deceleration desired by the vehicle driver, and at the same time orders the management device 141 to change to "recovery" mode, thereby automatically bringing about the charging of the super-capacitor 41. This charging can take place as long as the super-capacitor has not reached its maximum charge. At the maximum charge and in the case of a persistent demand for deceleration, the unit 21 for controlling the torque applied to the vehicle wheel diverts the electrical energy to a dissipating resistor (not shown) or ceases to operate the motor as a generator and, where appropriate, automatically actuates the mechanical brakes of the vehicle.

As soon as the vehicle driver demands acceleration, even if the super-capacitor is not at its maximum admissible charge, the unit 21 orders the management device 141 to go into "restoration" mode, and at the same time orders the inverter 221 to control the electric motor 231 so that it delivers an appropriate driving torque by discharging the super-capacitor 41, without acting on the engine.

The discharging can continue as far as a predetermined minimum threshold, but it is not desirable, in view of what a super-capacitor is, to go as far as total discharge. This is because, at a low charge level of a super-capacitor, the voltage is very low. The absorption of a given power imposes a current which is all the more intense since the charge level is low. Now, there is of course a limit to the admissible current. It is therefore advantageous to maintain a certain minimum charge level (low threshold), especially since the amount of energy stored in the super-capacitor at this voltage level is not very significant for traction.

In addition, even if the amount of residual energy stored in the super-capacitor is not very significant for traction, it nevertheless provides an energy store which is very useful for supplying certain electric elements if the engine is at low load, and therefore unable to develop sufficient power immediately. Of course, if it has been necessary to draw energy from the super-capacitor, thus bringing it below the predetermined minimum charge level, it is preferably advisable to recharge it immediately by drawing energy from the electrical energy source (here, the engine coupled to an electric machine).

Figure 2:
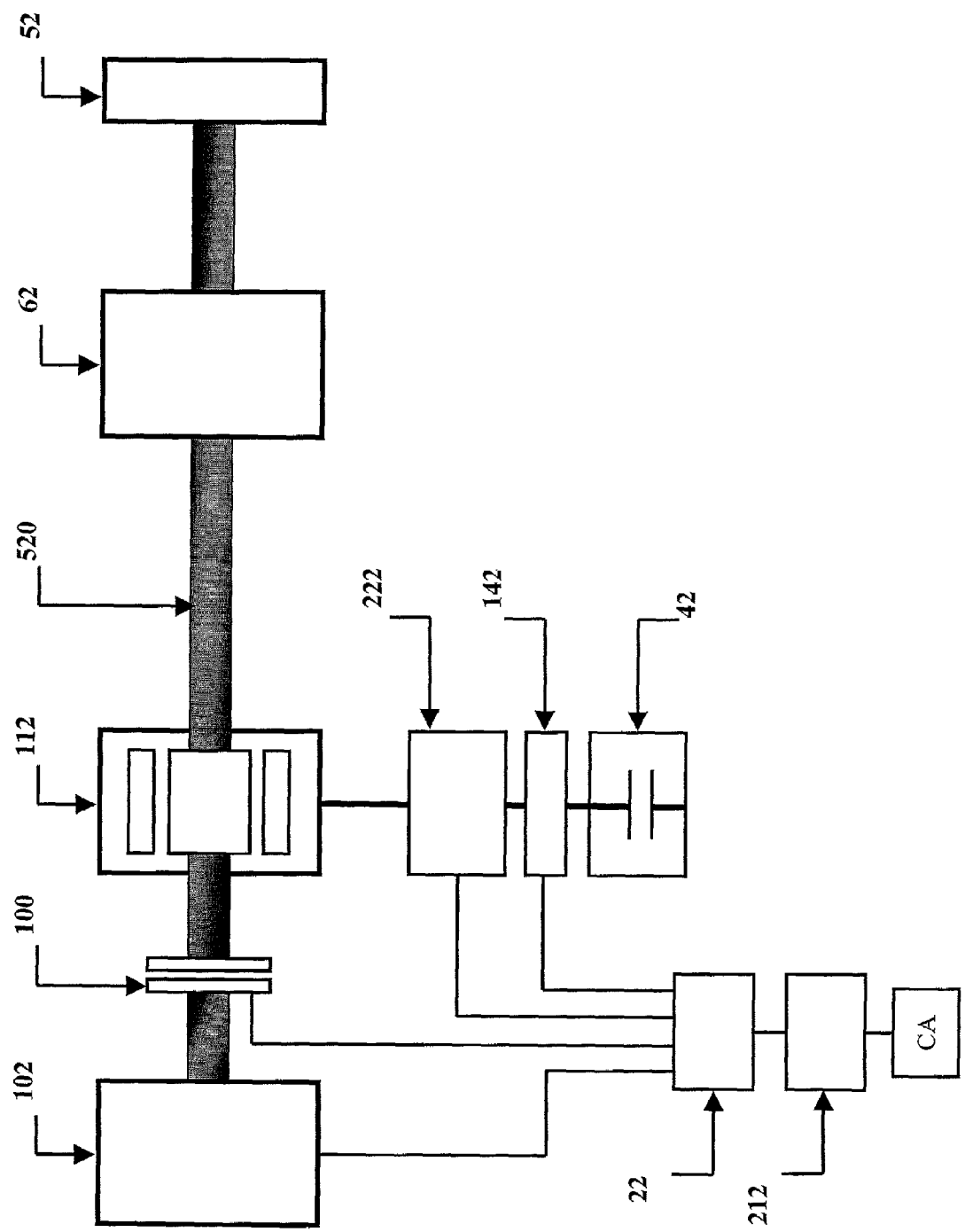
FIG. 2 is block diagram of a drivetrain for a parallel hybrid vehicle according to the invention.

In FIG. 2, there can be seen an engine 102 mechanically coupled to an electric machine 112 via a clutch 100. The electrical energy absorbed (or supplied) by this electric machine 112 comes from (or supplies) a super-capacitor 42 via a management device 142. The output shaft 520 of the electric machine 112 is mechanically coupled to a wheel 52, via a gearbox 62.

A unit 22 for controlling the torque applied to the vehicle wheel manages the circulation of the electrical energy in the drivetrain. This unit receives, among other things, the appropriate signals coming from a processing unit 212 for an acceleration control device CA at the disposal of the vehicle driver. Assuming that the super-capacitor 42 is at the minimum charge level to start with, at the first deceleration, the unit 22 for controlling the torque applied to the vehicle wheel orders the management device 142 to switch to "recovery" mode and an inverter 222 to drive the electric machine 112 as a generator, at a braking torque level corresponding to the deceleration desired by the vehicle driver, thereby automatically bringing about the charging of the super-capacitor 42. This charging can take place as long as the super-capacitor has not reached its maximum charge. At the maximum charge and in the case of a persistent demand for deceleration, the unit 22 diverts the electrical energy to a dissipating resistor (not shown) or ceases to operate the electric machine as a generator and, where appropriate, automatically actuates the mechanical brakes of the vehicle.

In all the vehicle diagrams, whether parallel hybrid or series hybrid or some other type, as soon as the vehicle driver demands acceleration, even if the super-capacitor is not at its maximum admissible charge, the central processing unit (21 or 22) orders the management device (141 or 142) to operate in "restoration" mode and orders the inverter (221 or 222) to drive the electric machine (231 or 112) as a motor, so that it delivers an appropriate driving torque by discharging the super-capacitor as a priority, in a first phase without acting on the electrical energy source.

Similarly, in all the vehicle diagrams, if the demand for traction is such that, at the maximum discharge current of the super-capacitors, the electric traction motor cannot supply sufficient torque, the priority aim, according to the invention, always to try to discharge the super-capacitor as a priority in the case of a demand for traction does not exclude the possibility of operating in addition the electrical energy source to supply the traction motor with electrical energy.

In the case of a demand for deceleration of the vehicle, operating the electric machine mechanically coupled to a wheel as a generator by using the electrical energy which it produces to recharge the super-capacitor to a state of maximum charge is an aim for the management of the drivetrain which has priority over any other form of braking the vehicle. However, the operating safety of the vehicle is, of course, always to be ensured. This may make it necessary to bring about traditional mechanical braking, where appropriate with a power of such a magnitude that the simultaneous recovery of energy might only involve a small or even negligible amount of energy in relation to the total braking energy involved.

As a final remark, it should be pointed out that, in all the vehicle diagrams, provision may be made in addition for operation not only in a management mode recovering the energy on braking as explained above, but also and in addition in a management mode allowing an immediate increase in acceleration, otherwise known by the term booster. In this case, the drivetrain will operate at least partly in accordance with another energy management mode, in which the priority aim is always to try and charge the super-capacitor to the maximum so as to be able to assist the engine (or more generally the electrical energy source) in the acceleration phase. It is possible to switch automatically between the mode according to the invention favoring recovery (always tending as a priority towards the low charge threshold) and this other mode favoring a booster-type action. If the mode according to the invention is characterized by the automatic search for a predetermined minimum charge level for the super-capacitor, the said other mode, termed booster mode, is characterized in contrast by the automatic search for a maximum charge level of which the super-capacitor storage device installed in the vehicle is capable. Not only is it possible to switch from one mode to the other, but it is of course possible to operate with the aim of automatically returning to any intermediate charge level. A manual selection may be made between two operating modes, one as far as possible recovering the braking energy as explained, and the other of the booster type, or else this selection may be placed under the control of a processor loaded with suitable programs for analyzing the driver's behavior, this program also being able to obtain some of its parameters via a link with a GPS system for route detection, in order to select automatically one of the two modes referred to above or any intermediate level.

What is claimed is:

1. An electric drivetrain for a vehicle, said drivetrain comprising:
   at least one acceleration and deceleration control device usable by a driver of the vehicle;
   a processing unit for the at least one control device allowing a desired driving torque to be determined and evaluated and a desired braking torque to be determined and evaluated;
   an electrical energy source for supplying electrical energy to an electric line;
   an electrical energy storage device connected to the electric line, said electrical energy storage device including one or more super-capacitors for storing electrical energy, and said electrical energy storage device being a unit different from said electrical energy source;

at least one electric machine connected to at least one driving wheel, and coupled to the electric line, wherein the electric machine is able to operate as a motor by absorbing electrical energy available an the electric line and transmitting a driving torque to the driving wheel, and wherein the electric machine is able to operate as a generator by transmitting a braking torque to the driving wheel and providing electrical energy to the electric line;

a device for managing an operating mode by selecting an energy recovery mode or an energy restoration mode; and a unit for controlling a torque transmitted to the driving wheel and being operable in accordance with priority criteria comprising:

in a case of a demand for a driving torque, the electric machine is operated as a motor by:

consuming the electrical energy stored in said electrical energy storage device as long as a charge of said electrical energy storage device is not below a predetermined minimum threshold, as a priority over use of said electrical energy source, for supplying electrical energy necessary for traction of the vehicle, and, consuming the electrical energy from said electrical energy source when the charge of said electrical storage device is below the predetermined minimum threshold; and in a case of a demand for a braking torque, the electric machine is operated as a generator by:

using the generated electrical energy to recharge said electrical energy storage device as long as the charge of said electrical energy storage device is not above a predetermined maximum threshold, as a priority over use of any other braking device, and dissipating the generated electrical energy, or ceasing operation of the electric machine as a generator, when the charge of said electrical energy storage device is above the predetermined threshold.

2. A drivetrain according to claim 1, for a vehicle of a parallel hybrid type.

3. A drivetrain according to claim 1, for a vehicle of a series hybrid type.

4. A drivetrain according to one of claim 1 to 3, in which said electrical energy storage device is able to store at least 70 kJ.

5. A drivetrain according to one of claim 1 to 3, in which said electrical energy storage device is able to store at most 150 kJ.

6. A drivetrain according to claim 1, in which said electrical energy storage device stores electrical energy only in super capacitors.

* * * * *

UNITED STATES PATENT AND TRADEMARK OFFICE
CERTIFICATE OF CORRECTION

PATENT NO. : 7,096,985 B2  
APPLICATION NO. : 10/096744  
DATED : August 29, 2006  
INVENTOR(S) : Jean-Jacques Charaudeau et al.

It is certified that error appears in the above-identified patent and that said Letters Patent is hereby corrected as shown below:

[56] REFERENCES CITED

Foreign Patent Documents  
"19923277 A1   12/1999" should be deleted.  
"4430670 A1    8/1994" should be deleted.

Other Publications  
After "Zelinka, A.", ""Trails" should read --Trials--; and "Kaiserslautem," should read --Kaiserslautern,--.

COLUMN 1

Line 53, "to be" should read --is to be--.

COLUMN 7

Line 4, "an" should read --on--.

Signed and Sealed this

Twenty-third Day of October, 2007

JON W. DUDAS  
*Director of the United States Patent and Trademark Office*